(12) United States Patent
Bong et al.

(10) Patent No.: US 7,038,159 B2
(45) Date of Patent: May 2, 2006

(54) SYSTEM AND METHOD FOR ELECTROSLAG WELDING AN EXPANSION JOINT RAIL

(75) Inventors: William L. Bong, Vallejo, CA (US); Stephen E. Toy, North Baltimore, OH (US); James R. Connor, North Baltimore, OH (US)

(73) Assignees: Arcmatic Integrated Systems, Inc., Vallejo, CA (US); D.S. Brown Company, Baltimore, OH (US)

( * ) Notice: Subject to any disclaimer, the term of this patent is extended or adjusted under 35 U.S.C. 154(b) by 0 days.

(21) Appl. No.: 10/712,390

(22) Filed: Nov. 12, 2003

(65) Prior Publication Data

US 2005/0098542 A1  May 12, 2005

(51) Int. Cl.
*B23K 9/18* (2006.01)

(52) U.S. Cl. ...................... 219/73.1; 219/54

(58) Field of Classification Search ............... 219/73.1, 219/54, 53, 137.2
See application file for complete search history.

(56) References Cited

U.S. PATENT DOCUMENTS

| | | | |
|---|---|---|---|
| 4,104,504 A * | 8/1978 | Ridenour et al. | 219/73.1 |
| 4,413,169 A * | 11/1983 | Cameron | 219/73.1 |
| 4,429,207 A * | 1/1984 | Devletian et al. | 219/73.1 |
| 5,175,405 A * | 12/1992 | Karimine et al. | 219/54 |
| 6,207,920 B1 * | 3/2001 | Morlock | 219/54 |
| 6,787,726 B1 * | 9/2004 | Thelen et al. | 219/54 |

* cited by examiner

*Primary Examiner*—Len Tran
(74) *Attorney, Agent, or Firm*—Virtual Legal, P.C.; Michael A. Kerr

(57) ABSTRACT

A system for butt welding expansion joint rails with an electroslag welding system. The electroslag welding system for butt welding the expansion joint rails comprises a control system. The method for butt welding the two expansion joint rails with the electroslag welding system comprises defining a weld cavity with a first expansion joint rail, a second expansion joint rail, a plurality of gland shoes, and a pair of butt shoes. The electroslag welding system can also be adapted to weld a expansion joint rail to a support beam. The method for welding the expansion joint rail to the support beam comprising placing the expansion joint rail on a horizontal axis, placing the support beam on a vertical axis and clamping a modular component system to the expansion joint rail.

12 Claims, 7 Drawing Sheets

SYSTEM AND METHOD FOR ELECTROSLAG WELDING AN EXPANSION JOINT RAIL

CROSS REFERENCES TO RELATED APPLICATIONS

This patent application is related to patent application Ser. No. 09/804,686 which was filed on Mar. 12, 2001 and is titled "Modular Welding System and Method", which is related to issued patent U.S. Pat. No. 6,297,472 that was issued on Oct. 2, 2001 and is titled "Welding System and Method".

BACKGROUND OF THE INVENTION

1. Field of Invention

The invention is related to welding. More particularly, the invention is related to a system and method for electroslag welding.

2. Description of Related Art

A typical highway and/or bridge includes a plurality of concrete sections that are spaced apart from one another to accommodate thermal expansion and contraction due to temperature changes. An expansion joint is inserted between the concrete sections to form a bridge between the concrete sections, thereby minimizing the irregularities on the surface of a highway. Thus, the expansion joint supports the dynamic traffic loads and accommodates the thermal expansion and contraction associated with bridges and/or highways. Additionally, the expansion joints can be configured to accommodate seismic loading.

Typically, the expansion joint includes a plurality of rails that are located between the concrete sections and are parallel to the edge of each concrete section. These expansion joint rails are parallel to one another and are evenly spaced apart from one another. The cross-section of the expansion joint rail varies depending on the expansion joint type. However, a gland cavity to hold the sealing element is required. Within the expansion joint, each of the flange faces of the expansion joint rail is substantially coplanar. A more detailed description of the expansion joint is provided in issued U.S. Pat. No. 4,923,328 titled "Maintainable Expansion Joint For Highways, Bridges and the Like" which is hereby incorporated by reference.

The expansion joint rails are supported by an advanced structure or a plurality of support beams which are tee-welded to the expansion joint rail. When support beams are used they are perpendicular to the expansion joint rails. Generally, the support beams are composed of the same parent materials as the expansion joint rails. During the process of fabricating the expansion joint, the expansion joint rails must be butt-welded together. The most common technique for butt-welding the expansion joint rails is to use flux cored arc welding techniques. Alternatively, shielded metal arc welding or submerged arc welding techniques may be used for butt-welding the expansion joint rails. Additionally, during the process of welding the expansion joint rails to the support beams, flux cored arc welding, shield metal welding or submerged arc welding techniques are used.

All the above mentioned welding techniques employ a multi-pass process for applying the weld metal to a weld cavity, which is time consuming. The number of man-hours required for butt-welding expansion joint rails is approximately 4 hours and for tee-welding the expansion joint rail to a support beam is approximately 2 hours. Therefore, it would be beneficial to provide a system and method for more efficiently butt-welding the expansion joint rails and tee-welding the expansion joint rails to the support beams.

SUMMARY

A welding system for butt welding expansion joint rails and the tee welding of support beams to expansion joint rail having a control system. The expansion joint rail comprises at least one gland cavity and possibly a second gland cavity to receive the sealing element. Each gland cavity has a fixed distance from the top of the expansion joint rail. The welding system has a welding shoe assembly that comprises at least one gland shoe and a pair of butt shoes. The gland shoes are configured to occupy each gland cavity of the expansion joint rail. The butt shoes abut the expansion joint rail and the at least one gland shoe. In the illustrative embodiment, the gland shoes and the butt shoes are composed primarily of copper. Additionally the illustrative embodiment provides for each gland cavity to be occupied by a top gland shoe and a bottom gland shoe that are each beveled. The illustrative gland shoes are water-cooled.

The illustrative welding system is an electroslag welding system that is configured for butt welding the expansion joint rails. The electroslag welding system comprises a control system that is embodied in a basic component system and a modular component system. The basic component system has an operator control module which controls inter alia a wire feeder, a power supply and flux addition. The modular component system interfaces with the basic component system and is controlled by the operator control module. The modular component system comprises a weld torch which receives at least one welding wire from the wire feeder. As described above, the welding shoe assembly comprises gland shoes configured to occupy each gland cavity and a pair of butt shoes that abut the expansion joint rail and the gland shoes. Thus, the welding shoe assembly is configured to confine the electroslag weld puddle.

The illustrative electroslag system can also be used to weld a expansion joint rail to a support beam. The expansion joint rail is disposed on horizontal axis and the support beam is disposed on a vertical axis. The electroslag welding system for this weld is modified so that the modular welding system includes a clamping mechanism that fixedly couples the modular component system to the expansion joint rail. The modular component system also includes an angled torch adapter and an angled consumable guide tube. The angled torch adapter is coupled to a welding torch that receives welding wire from the wire feeder. The angled consumable guide tube feeds the welding wire into the weld cavity defined by the weld face of the expansion joint rail and the weld face of the support beam.

The method for welding the expansion joint rail to the support beam comprising placing the expansion joint rail on a horizontal axis and the support beam on a vertical axis. The method then proceeds to clamp the modular component system to the expansion joint rail. The weld cavity is then defined using a pair of welding shoes. The welding of the expansion joint rail to the support beam comprises feeding welding wire into the weld cavity with the consumable guide tube. The method then proceeds to generate an electroslag weld within the weld cavity.

BRIEF DESCRIPTION OF THE DRAWINGS

Embodiments for the following description are shown in the following drawings.

DESCRIPTION

Figure 1:
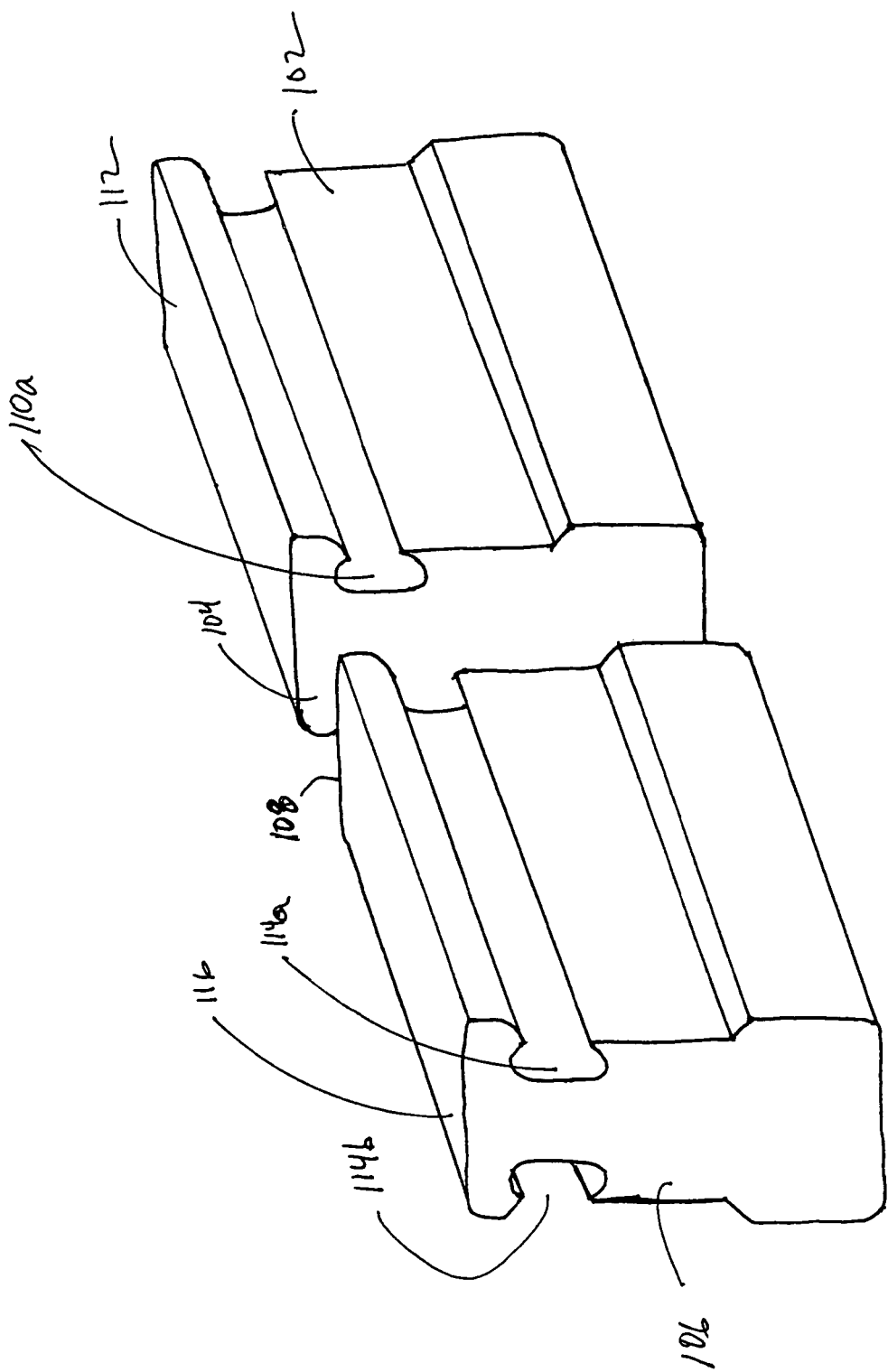
FIG. 1 is an isometric view of two expansion joint rails that are being positioned for butt welding.

In the following detailed description, reference is made to the accompanying drawings, which form a part of this application. The drawings show, by way of illustration, specific embodiments in which the invention may be practiced. It is to be understood that other embodiments may be utilized and structural changes may be made without departing from the scope of the appended claims.

1. Electroslag Welding System (General)

Within the past decade, various federal organization and educational institutions have investigated the electroslag welding process. The main purpose for these investigations has been to develop methods to improve the physical qualities of the electroslag process so that electroslag welding could meet stringent code requirements. Due in part to these investigations, the electroslag welding process was modified to the Narrow Gap Improved—Electroslag Welding (NGI-ESW) process.

Arcmatic Integrated Systems, Inc. has developed a highly integrated mechanical and electrical control system for performing the NGI-ESW process that is described in issued U.S. Pat. No. 6,297,472 titled "Welding System and Method" and in U.S. patent application Ser. No. 09/804,686 entitled "Modular Welding System and Method which are both hereby incorporated by reference. The issued patent and patent application describe a system and method for controlling a plurality of welding variables during the NGI-ESW process. One of the benefits associated with Arcmatic's solution is that it provides a reliable and repeatable system and method for generating an electroslag weld.

As described in the materials that are incorporated by reference, the electroslag welding system comprises a control system that manages a plurality of weld parameters. The control system is a modular system that comprises a basic component system and a modular welding system. The basic component system has an operator control module which controls inter alia a wire feeder, a power supply and flux addition. The modular component system interfaces with the basic component system and is controlled by the operator control module. The modular component system comprises a weld torch that receives at least one welding wire from the wire feeder. Additionally, the modular component system comprises a welding shoe assembly that is configured to define a weld cavity and confines the electroslag weld puddle.

A consumable guide tube is used to guide the welding wire into the weld cavity. A more thorough description of the consumable guide tube is provided in U.S. patent application Ser. No. 09/757,738 entitled "Consumable Guide Tube" which is hereby incorporated by reference. The consumable guide tube transmits welding amperage, voltage and current to the weld puddle. The consumable guide tube and welding wire is converted to a weld material during the electroslag welding process.

It shall be appreciated by those skilled in the art having the benefit of this disclosure that systems and methods described are not confined to electroslag welding. The illustrative electroslag welding systems and methods described in this patent teaches a method of welding expansion joint rails that substantially reduces the number of man-hours needed to perform a weld. The number of man-hours are reduced by building intelligence into a welding system that uses sensors, software and hardware to effectively control a variety of weld parameters. The prior art fails to teach or describe the use of a control system for butt welding a expansion joint rail or for tee welding a expansion joint rail/support beam.

Thus, the illustrative electroslag welding system and method is provided as an illustrative example of using a sophisticated control system to weld expansion joint rails or beams that are substantially similar to expansion joint rails. For example, other single pass or multipass welding systems and methods may be adapted to perform the butt welds and tee welds described in this patent. By way of example and not of limitation, a multi-pass shielded metal arc welding, flux core arc welding, and submerged arc welding process may be adapted to perform the butt welds and tee welds described below. Additionally, an electrogas welding system and method may be adapted to perform the butt-weld and tee-weld described below.

The illustrative electroslag system described herein can be purchased from Arcmatic Integrated Systems, Inc. located in Vallejo, Calif. The ARCMATIC™ electroslag welding system is a fully integrated electroslag welding system. For purposes of performing the welds described hereinafter, the electroslag welding system comprises: a VERTASLAG™ Portable Cart Assembly having 180 degree manual rotation, 7 feet of motorized lift, counterbalanced boom, fork lift and crane; a DC-1000 ampere Lincoln power supply with toggle switch to convert to manual welding which has been modified to work with ARCMATIC™ Control System; a brute force 4-wire feeder; a two-wire motorized wire straightener; two wire guide assemblies; a water circulator; an Operator Control Module; a brute-force wire feed control module; a dual wire straightener module; a welding power supply control module; a flux control module with a motorized flux dispenser; 12-inch Butt Shoes; 9-inch tee shoe assemblies. Additionally a butt-tee fixture module is needed which includes: a fixture frame for welding butt and tee welds; a forward/reverse torch adjust slide; three manual slides, a welding torch rotator; a 2000 ampere 4-wire welding torch assembly; and an automatic flux feeder.

The illustrative consumables that are used with the electroslag system may also be purchased from Arcmatic Integrated Systems, Inc. By way of example and not of limitation, the welding wire is a VERTASLAG™ Metal Cored Wire VMC-105 having a diameter of $3/32"$. The welding flux is a VERTASLAG™ Flux VF-107 and the guide tube is a VERTASLAG™ Guide Tube having insulator buttons composed of VERTASLAG™ Flux with alumina glue baked at 250° F.

2. Welding Expansion Joint Rails

Referring to FIG. 1. there is shown an isometric view of two expansion joint rails that are being positioned for butt welding. By way of example and not of limitation, the expansion joint rails are composed of a steel material which those skilled in the art refer to as A36, A572 Grade 50, A588 or similar steel specification. A first expansion joint rail 102 has a first weld face 104 that is disposed a fixed distance from a second expansion joint rail 106 having a second weld face 108. The expansion joint rail 102 includes a pair of gland cavities 110a and 110b (not visible) that are disposed an equal distance from the top flange 112. The expansion joint rail 106 also includes a pair gland of cavities 114a and 114b that are disposed an equal distance from the top flange 116.

To butt weld the expansion joint rails 102 and 106, a welding shoe assembly is needed to contain the electroslag weld puddle. As evident by the FIG. 1 the welding shoe assembly must accommodate the gland cavities 110a, 110b (not visible), 114a and 114b so that weld metal does not spill out of the gland cavities. Additionally, the welding shoe assembly must accommodate the shape of the expansion joint rail.

Figure 2:
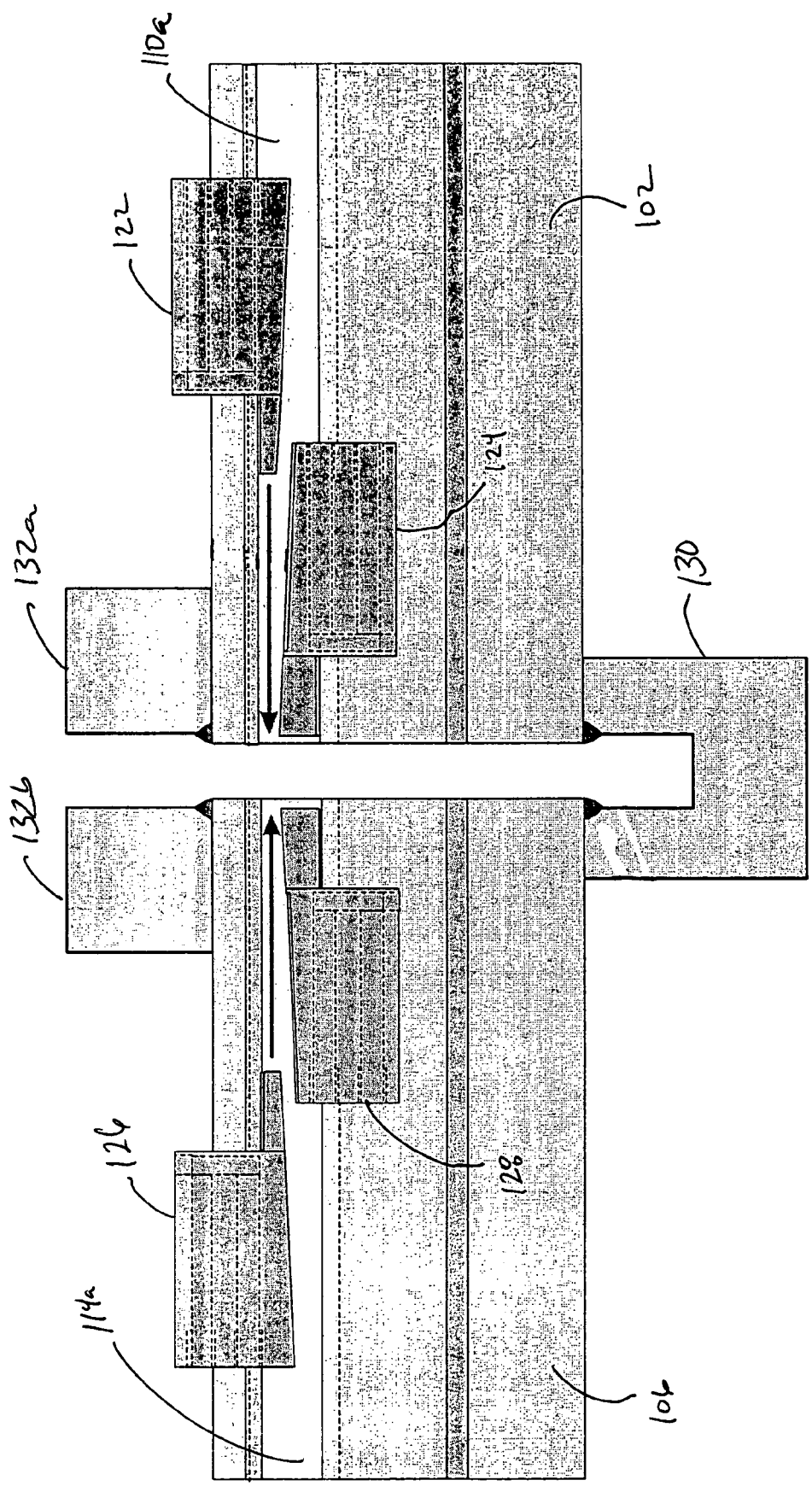
FIG. 2 is a side view of a plurality of gland shoes that occupy the gland cavities associated with each expansion joint rail.

Referring to FIG. 2, there is shown a side view of a plurality of gland shoes that occupy the gland cavities associated with each expansion joint rail. The gland shoes that occupy the gland cavity 110a comprise a top gland shoe 122 and a bottom gland shoe 124 that can be slid along the gland cavity 110a. When the top gland shoe 122 and bottom gland shoe 124 abut one another, they have a small clearance of 0.1000" that substantially seals the gland cavity 110a. The sealed gland cavity 110a prevents an electroslag weld puddle from spilling into the gland cavity 110a. Both gland shoes 122 and 124 are beveled to ease the removal of the gland shoes 122 and 124 after completion of the illustrative electroslag weld. In the illustrative example the gland shoes are composed of oxygen free high conductivity copper referred to as OFHC-101. The OFHC-101 has a high conductivity that prevents the cracking of welds. Additionally, the illustrative gland shoes 122 and 124 are drilled to permit water cooling. As long as the gland cavities are located in substantially the same position from the top of the expansion joint rail, the illustrative gland shoes may be used on expansion joint rails having different widths and heights.

The other expansion joint rail 106 also has an associated top gland shoe 126 and a bottom gland shoe 128 that occupies the gland cavity 114a. The top gland shoes 126 and 128 are similar in construction as gland shoes 122 and 124.

FIG. 2 also displays a weld sump 130 that is tack welded to the bottom of the expansion joint rail 102 and the expansion joint rail 106. The weld sump is composed of the same material as the expansion joint rail and is used to collect weld material that is generated after the electroslag welding process is initiated. The weld material collected in the weld sump is removed during fabrication. FIG. 2 also shows blocks 132a and 132b that are used as run-off tabs. By way of example and not of limitation, the 132a and 132b run-off tabs are copper blocks composed of OFHC-101 or steel composed of the same material as the expansion joint rail. Additionally, these copper blocks are reusable, whereas the steel blocks are removed during fabrication.

Figure 3:
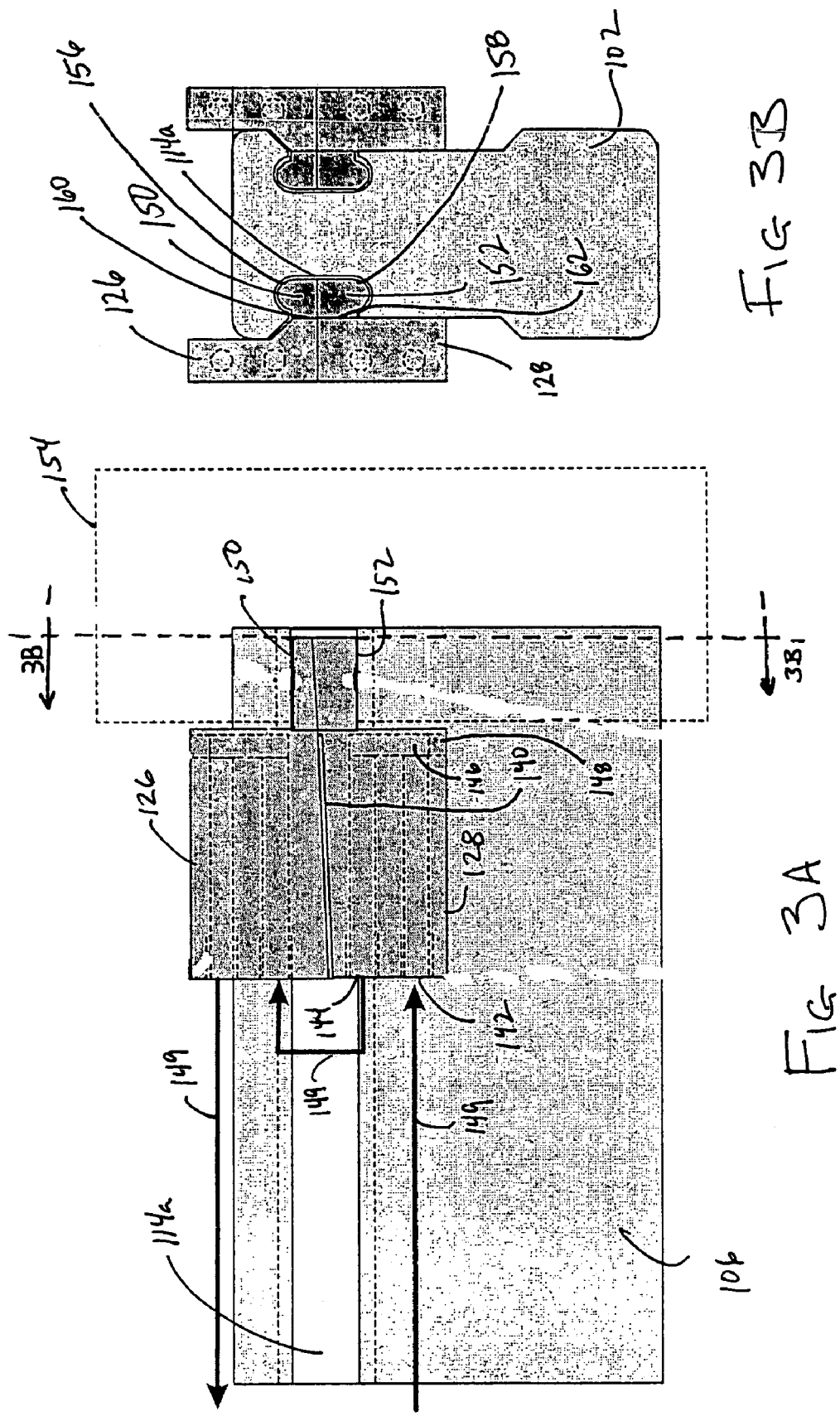
FIG. 3A shows a side view of a pair of gland shoes that occupy a gland cavity.
FIG. 3B is a sectional view taken on line 3B—3B of FIG. 3A.

Referring to FIG. 3A there is shown a side view of a pair of gland shoes that occupy a gland cavity. More particularly, the top gland shoe 126 slidably interfaces with the bottom gland shoe 128 within the gland cavity 114a of expansion joint rail 106. By way of example, the bottom gland shoe 128 comprises a low friction pad 140 that is glued to the top surface of the bottom gland shoe 128 to further provide easier removal of the gland shoes 126 and 128. The illustrative low friction pad may be composed of teflon or any composite material which would facilitate separation of the gland shoes. Alternatively, the low friction pad 140 may not be used for the bottom gland shoe 128.

Each gland shoe may be water cooled by circulating water through the gland shoes. To provide for water circulation, each gland shoe is drilled with two horizontal holes and one vertical hole with a plug soldered in one end. For example, for gland shoe 128 there are two horizontal holes 142 and 144 that are drilled and one vertical hole 146 that is drilled. Additionally, there is a plug 148 that is used to plug one end of the vertical hole 146. The arrows 149 indicate an illustrative path for the water circulation.

Each of the gland shoes 126 and 128 comprises a distal portion 150 and 152, respectively. The distal portions 150 and 152 are shaped so that the grooved side of each distal portion 150 and 152 interfaces with the gland cavity 114a. Each of the distal portions 150 and 152 also includes a flat side that is configured to interface with a butt shoe 154.

Referring to FIG. 3B there is shown a sectional view taken on line 3B—3B of FIG. 3A. The sectional view shows the distal portions 150 and 152 interfacing with the gland cavity 114a. Additionally, the sectional view shows the grooved side 156 and 158 associated with distal portions 150 and 152, respectively. Furthermore, the sectional view shows the flat sides 160 and 162 associated with distal portions 150 and 152, respectively. The flat sides 160 and 162 are configured to interface with a butt shoe as described in further detail below.

Figure 4:
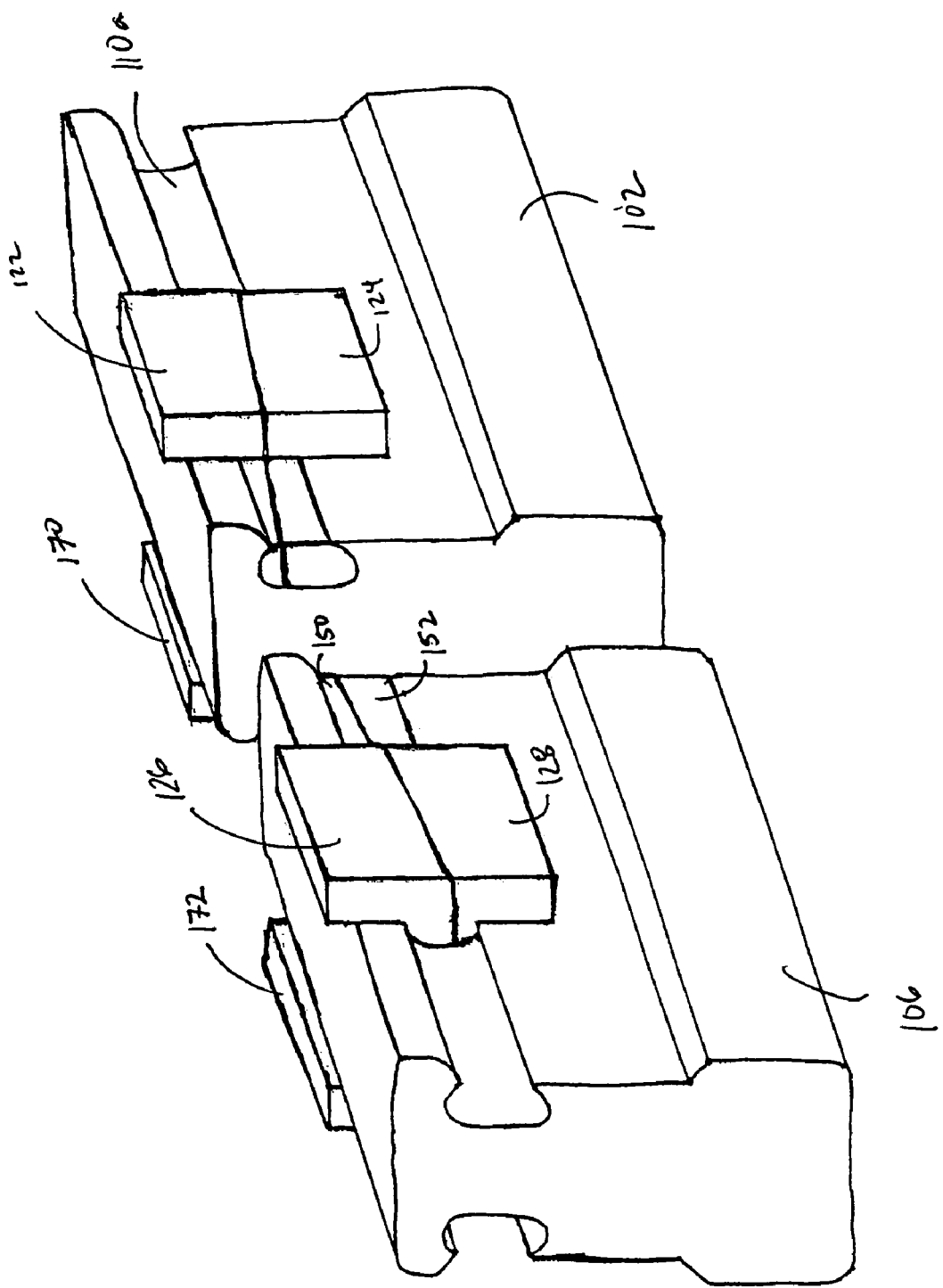
FIG. 4 there is an isometric view of gland shoes positioned within the expansion joint rails.

Referring to FIG. 4 there is shown an isometric view of gland shoes positioned within the expansion joint rails. The expansion joint rails 102 and 106 are shown having gland shoes interfacing with the gland cavities associated with each expansion joint rail. For expansion joint rail 102, the top gland shoe 122 interfaces with the bottom gland shoe 124 within gland cavity 110a. On the opposite side of the expansion joint rail 102, there is shown the top of another top gland shoe 170 which is also interfacing with gland cavity 110b (not shown). The isometric view of expansion joint rail 106 shows the bottom gland shoe 128 interfacing with the top gland shoe 126 and shoes the distal portions 150 and 152 having the flat sides which interface with a butt shoe. On the opposite side of the expansion joint rail a portion of another top gland shoe 172 is shown.

Figure 5A:
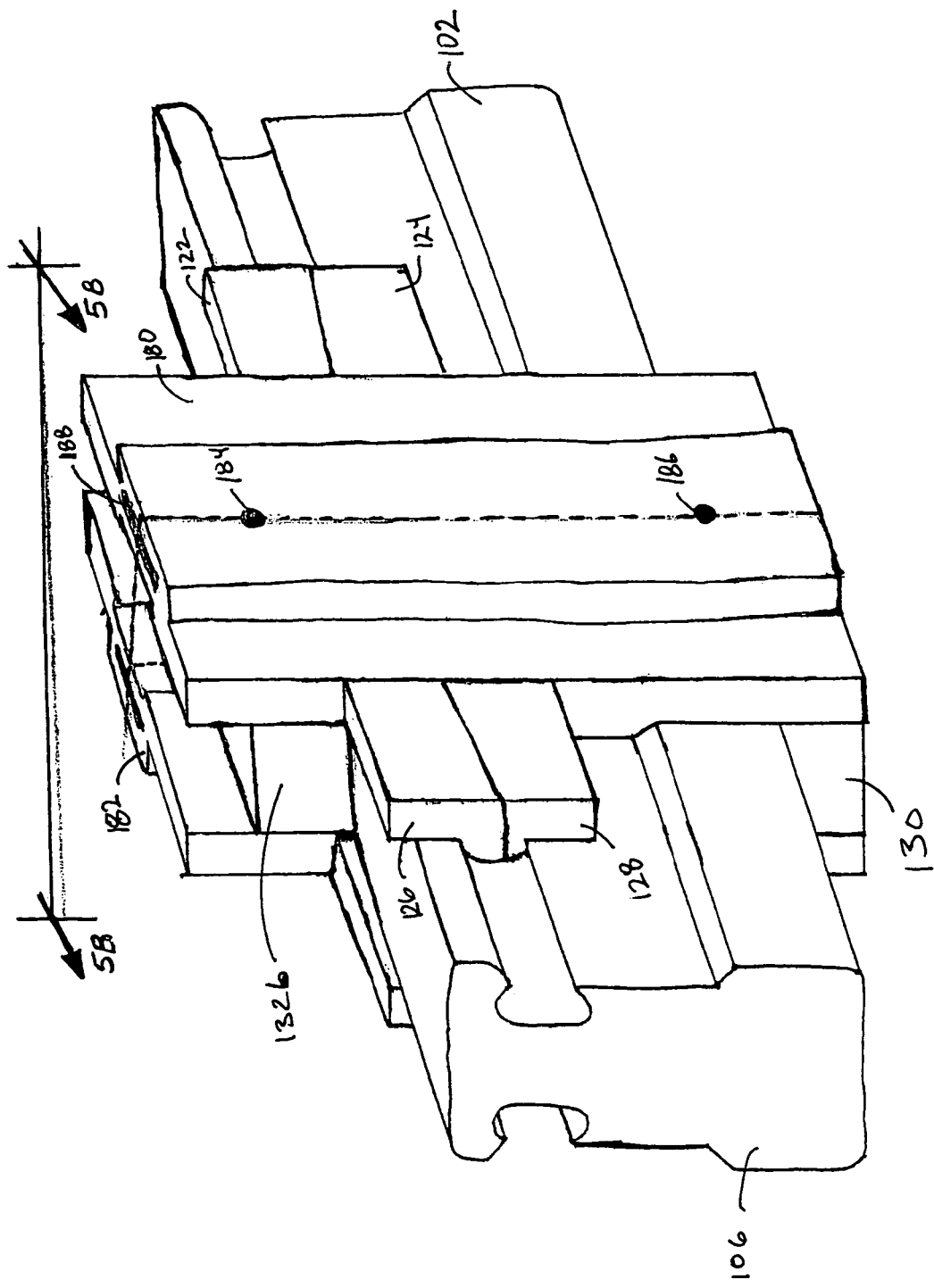
FIG. 5A is an isometric view of butt shoes and gland shoes positioned for welding the expansion joint rails.

Referring to FIG. 5A there is shown an isometric view of butt shoes and gland shoes positioned for welding the expansion joint rails. In the illustrative embodiment, the butt shoes are composed of copper OFHC-101. The butt shoes 180 and 182 interface with the expansion joint rails 102 and 106, and each pair of gland shoes including the pair of gland shoes 122 and 124 disposed on expansion joint rail 102, and the pair of gland shoes 126 and 128 disposed on expansion joint rail 106. In the illustrative embodiment the butt shoes are water-cooled and held in place by a "C" clamp (not shown). By way of example and not of limitation, for butt shoe 180 there at two holes at least two ports 184 and 186 for water circulation. Additionally, an air gap 188 can also be used to help in cooling the illustrative butt shoe 180.

The combination of the butt shoes 180 and 182 abutting the expansion joint rails 102 and 106 and each pair of gland shoes define a weld cavity in which weld material is deposited. Additionally, the weld cavity is defined by the weld sump 130 and the visible block 132b that is a run-off tab. The weld material is deposited using a control system. By way of example and not of limitation, the control system is embodied in the illustrative electroslag welding system and method which is described above.

Figure 5B:
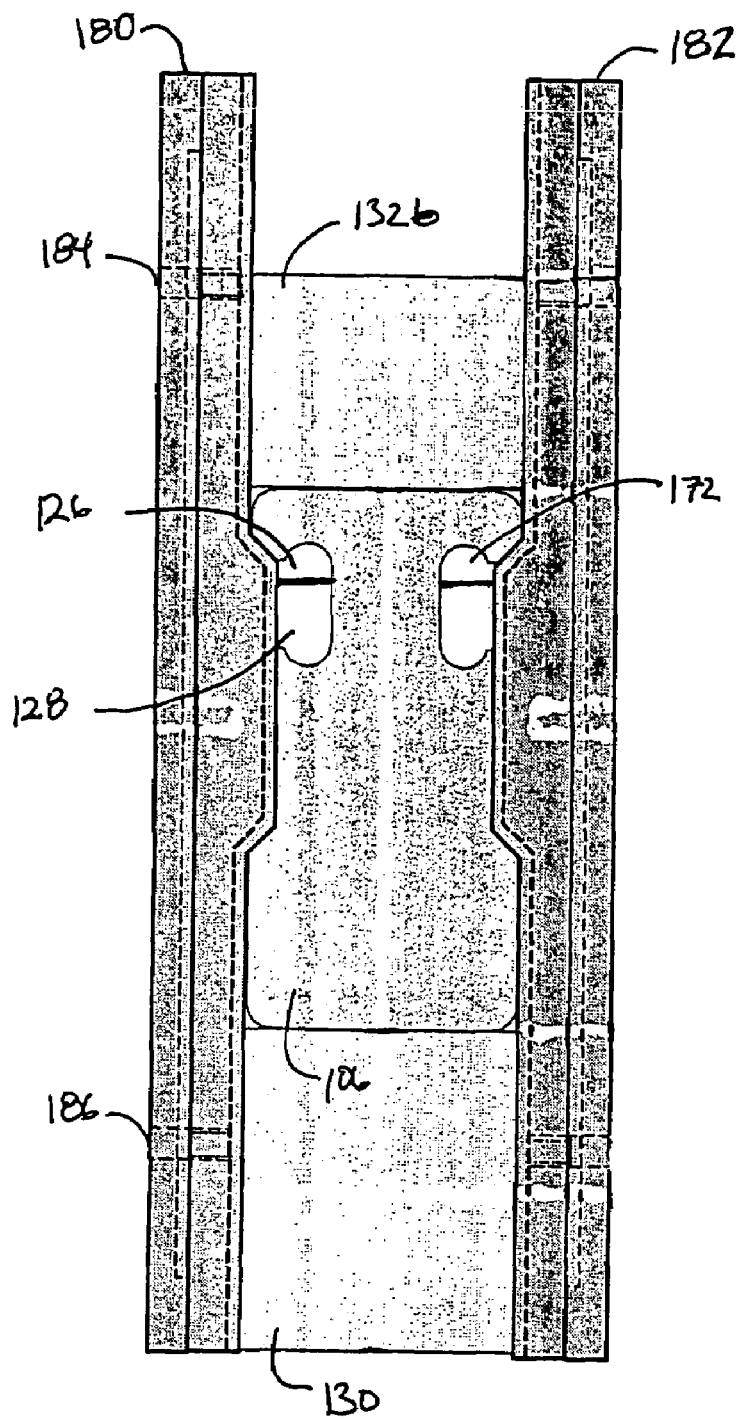
FIG. 5B is a sectional view on line 5B—5B of FIG. 5A.

Referring to FIG. 5B there is shown a sectional view on line 5B—5B of FIG. 5A. The sectional view shows more clearly shoes how the butt shoes 180 and 182 define the weld cavity. For example, butt shoe 180 interfaces with the expansion joint rail 106 and the top gland shoe 126 and bottom gland 128. Additionally, the butt shoe 180 interfaces with the weld sump 130 and run-off tab 132*b*. The butt shoe 180 also has two ports 184 and 186 for water circulation.

In operation, the method for butt welding the two expansion joint rails with a welding system comprises defining a weld cavity as described above. The method then proceeds to fill the weld cavity with molten metal. The process of generating the molten metal is carried out by having a weld operator enter the desired parameters into the illustrative electroslag control system.

As described above, the electroslag control system is a modular system that comprises a basic component system and a modular welding system. The basic component system comprises an operator control module which controls a wire feeder, a power supply and flux addition. The modular component systems interfaces with the basic component system and is controlled by the operator control module. The modular component system comprises a weld torch that receives at least one welding wire from the wire feeder. Additionally, the modular component system comprises a welding shoe assembly as described above.

During the electroslag welding process, flux addition is a highly controlled welding variable. Those skilled in the art shall appreciate that the electroslag process does not use a welding arc to join two plates. The welding arc is only used in the first few moments of the weld to melt the welding flux. The flux then becomes a molten resistor that floats on top of the molten weld metal. This molten resistor is responsible for melting the surface of the two plates to be joined together, for melting the welding wire passing through it, and for melting the bottom end of the consumable guide tube as the weld proceeds upward. The temperature of the flux is determined by the size of the molten resistor and the wattage (amps*volts) produced by the welding power supply. If the wattage passing through the resistor is held relatively constant, the heat of the resistor will vary according to the size of the resistor. Thus, as the resistor becomes larger (because the weld puddle gets deeper) the resistor cools, and the resistor becomes smaller (because the weld puddle gets shallower) the resistor becomes hotter.

The temperature of the molten flux puddle will directly affect the amount of parent material that is melted on either side of the weld joint (weld penetration, or the size of the weld nugget). To keep the weld penetration constant, the molten puddle depth should remain relatively constant during the welding operation. The control system for the flux dispenser is programmed to deposit the correct amount of flux (in grams) at the appropriate time to make a sound eletroslag weld.

In operation, the welding operator presses the Cycle Start button, the first thing that happens, prior to wire feed, is the flux dispense deposits what the "Preweld Flux Deposit". After the wire begins to feed, and the welding arc is struck, the Preweld Flux Amount is melted to begin to form the molten electroslag flux puddle. During this "Initial Weld Time", an additional amount of flux is slowly deposited; this flux is referred to as the "Initial Flux Deposit". The combination of the Preweld and the Initial flux deposits make up the correct height and size of the molten weld puddle. The amount of flux deposited is determined by the thickness of the plates to be joined. Plating against the water-cooled copper shoes loses a certain amount of flux as the weld proceeds vertically upward. The flux dispenser is programmed to maintain a constant height by replacing this lost flux—this is referred to as "Replacement Flux Deposit", during the entire run of the weld.

Additional welding parameters that are input into the operator control module includes setting the amperage to approximately 920 Amps, the voltage to 34V, and the wire speed to 140 inches per minute.

After the illustrative electroslag weld is completed the butt shoes 180 and 182 are removed. Additionally, the gland shoes are also removed. It shall be appreciated by those of ordinary skill in the art having the benefit of this disclosure that the weld material between the expansion joint rails includes a gland plug (not shown) that occupies the desired gland cavity. For expansion joint applications, the gland plug must be removed. Those skilled in the art shall appreciate that there are a variety of well-known techniques for removing the gland plug including oxy/fuel torch cutting, plasma cutting, carbon arc gouging, milling or broaching out the gland plug.

3. Welding Expansion Joint Rail to Support Beam

Figure 6:
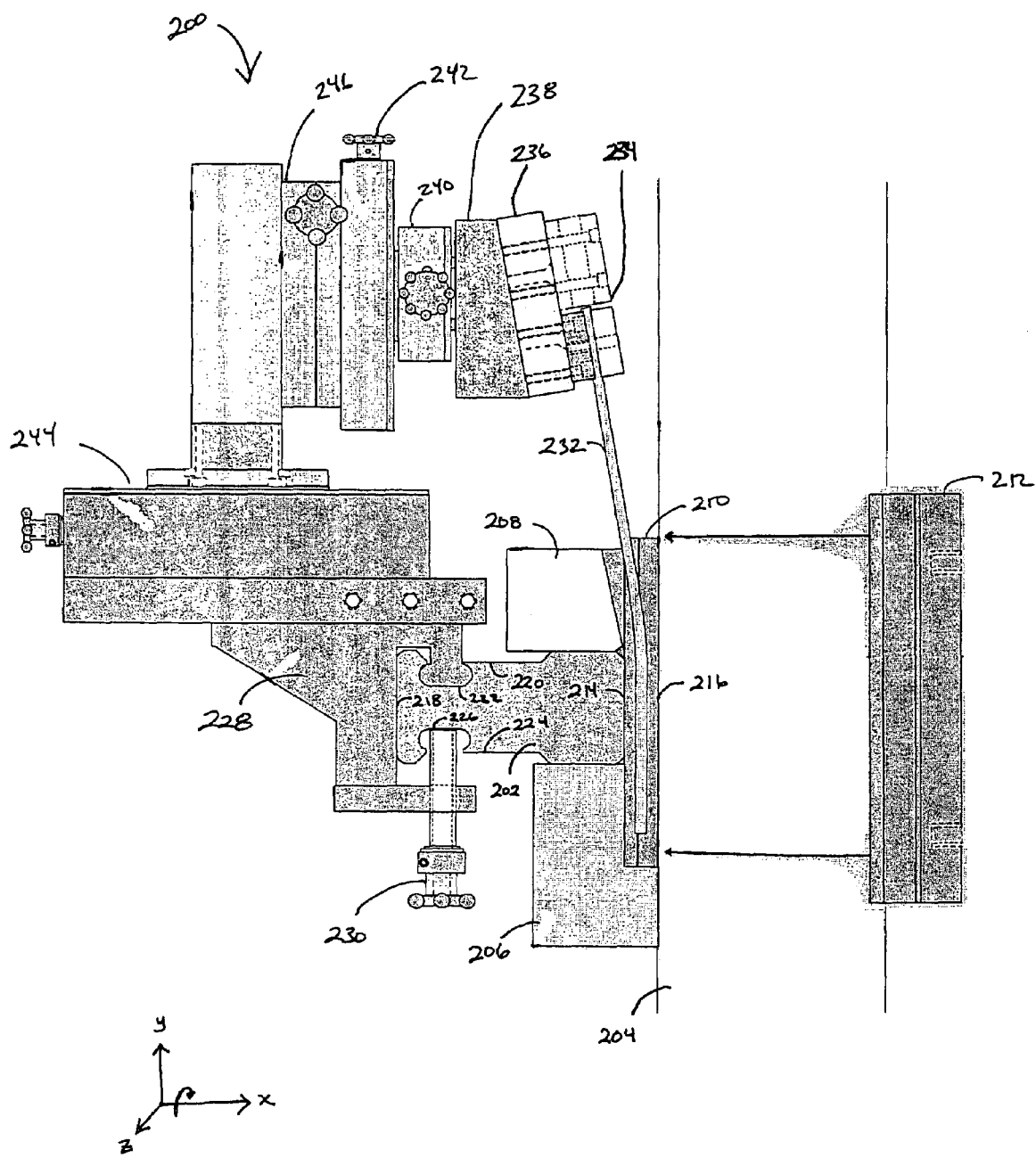
FIG. 6 there is a welding system for welding a expansion joint rail to a support beam.

Referring to FIG. 6 there is shown a welding system for welding a expansion joint rail to a support beam. As shown in FIG. 6, the modular component 200 of the electroslag welding system described above has been adapted to weld a expansion joint rail 202 to a support beam 204. The expansion joint rail 202 is disposed on horizontal axis and the support beam 204 is disposed on a vertical axis. The weld cavity for performing this weld is defined by an electroslag sump 206, run-off tab 208, welding shoes 210 and 212, the weld face of the expansion joint rail 202, and the weld face 216 of the support beam 204. Those skilled in the art shall appreciate that the welding shoe 212 is being positioned into place and the arrows indicate the general position for this weld shoe.

The modular component system 200 is clamped to the expansion joint rail 202. The expansion joint rail has a distal face 218, a first face 220 with a first gland cavity 222, and a second face 224 with a second gland cavity 226. The modular component system 200 is clamped to the expansion joint rail 202 with a clamping mechanism 228 that interfaces with the distal face 218 and gland cavities 222 and 226. The clamping mechanism includes a screw 230 that fixedly couples the modular component system 200 to the expansion rail 202.

A consumable guide tube 232 is positioned in the weld cavity. The consumable guide tube 232 guides the welding wire (not shown) into the weld cavity. In the illustrative embodiment, the guide tube is a dual wire guide tube, although one or more welding wires may be fed by the guide tube. The guide tube 232 is angled so that it can fit in the weld cavity. In this illustrative embodiment the guide tube 232 is angled an approximately 10° from the plane of support beam 204. The guide tube 232 is angled because the vertically positioned support beam 204 prevents the guide tube 232 from being positioned vertically. The guide tube 232 is held in place by a weld torch 234 that is fixedly coupled to a weld torch insulator 236. The weld torch 234 is configured to receive at least one welding wire from a wire feeder (not shown). The welding wire is feed into the weld cavity and is "consumed" in the weld with the consumable guide tube.

The angled guide tube 232 is fit into the weld cavity using a plurality of slides and a torch rotator which are operatively coupled to the angled torch adapter 238. The first slide 240 positions the guide tube 232 along the z-axis which is parallel to the expansion joint rail 206. The second slide 242 positions the guide tube 232 along the y-axis which is parallel to the support beam 204. The third slide 244 positions the guide tube along the x-axis which moves the guide tube from left to right as shown. The weld torch rotator 246 provides fine tune rotational control of the guide tube 232 about the x-axis.

The method for welding the expansion joint rail 202 to the support beam 204 comprises placing the expansion joint rail 202 on a horizontal axis and the support beam 204 on a vertical axis. The sump 206 and run-off tab 208 are tack welded into place. The modular component system 200 is clamped onto the expansion joint rail 202. The welding shoes 210 and 212 are put into place and help define a weld cavity. The guide tube 232 is then properly fit within the weld cavity using the slides 240, 242, 244 and the torch rotator 246. The control system is programmed to initiate welding by a weld operator. In the illustrative embodiment, an operator control module is used to program the control system. The control system then proceeds to inter alia start the welding process and controls the feeding of the welding wire into the weld cavity. After the expansion joint rail 202 is welded to the support beam 204, the method can be applied to weld the next support beam to the expansion joint rail 202.

Although the description about contains many limitations in the specification, these should not be construed as limiting the scope of the invention but as merely providing illustrations of some of the presently preferred embodiments of this invention. Thus, the scope of the invention should be determined by the appended claims and their legal equivalents rather than by the examples given.

What is claimed is:

1. A system for butt welding two expansion joint rails with a control system, wherein each expansion joint rail comprises at least one gland cavity having a fixed distance from the top of each expansion joint rail, said system having a welding shoe assembly comprising:

a top gland shoe and a bottom gland shoe configured to occupy said at least one gland cavity; and a pair of butt shoes that abut said expansion joint rail and said top gland shoe and said bottom gland shoe.

2. The system of claim 1 wherein said top gland shoe and said bottom gland shoe are composed primarily of copper.

3. The system of claim 2 wherein said plurality of butt shoes are composed primarily of copper.

4. The system of claim 1 wherein said top gland shoe and said bottom gland shoe are beveled.

5. The system of claim 1 wherein said top gland shoe and said bottom gland shoe slidably interface with one another.

6. The system of claim 1 wherein said top gland shoe and said bottom gland shoe are water cooled.

7. A welding shoe assembly for butt welding two expansion joint rails wherein each expansion joint rail comprises at least one gland cavity having a fixed distance from the top of each expansion joint rail, said welding shoe assembly, comprising:

a top gland shoe and a bottom gland shoe configured to occupy said at least one gland cavity; and a pair of butt shoes that abut said expansion joint rail and said at least one gland shoe.

8. The welding shoe assembly of claim 7 wherein said top gland shoe and said bottom gland shoe are composed primarily of copper.

9. The welding shoe assembly of claim 8 wherein said plurality of butt shoes are composed primarily of copper.

10. The welding shoe assembly of claim 7 wherein said top gland shoe and said bottom gland shoe are beveled.

11. The welding shoe assembly of claim 7 wherein said top gland shoe and said bottom gland shoe slidably interface with one another.

12. The welding shoe assembly of claim 7 wherein said top gland shoe and said bottom gland shoe are water cooled.

* * * * *